Z. PHILLIPS.
Brick-Machine.

No. 8,284. Reissued June 11, 1878.

Witnesses;
S. C. Trink
C. J. Rackliffe

Inventor.
Zelora Phillips.
Per E. C. Trink.
his Attorney

N. PETERS, PHOTO-LITHOGRAPHER, WASHINGTON, D. C.

UNITED STATES PATENT OFFICE.

ZELORA PHILLIPS, OF LITTLE ROCK, ARKANSAS.

IMPROVEMENT IN BRICK-MACHINES.

Specification forming part of Letters Patent No. 108,511, dated October 18, 1870; Reissue No. 8,284, dated June 11, 1878; application filed April 15, 1878.

*To all whom it may concern:*

Be it known that I, ZELORA PHILLIPS, of Little Rock, in the county of Pulaski and State of Arkansas, have invented certain new and useful Improvements in Brick-Machines, which are fully set forth and described in the following specification and illustrated in the accompanying drawing.

My invention relates to a new method of making pressed brick.

The object of my invention is to make pressed brick direct from the raw material.

My invention consists, mainly, in the new construction, arrangement, and application of devices; also, in the new combination of old elements, all of which, singly or combined, are deemed essential in my newly-organized machine for making pressed brick, whereby new and useful results are obtained, as will be hereinafter fully described and set forth.

Figure 1:
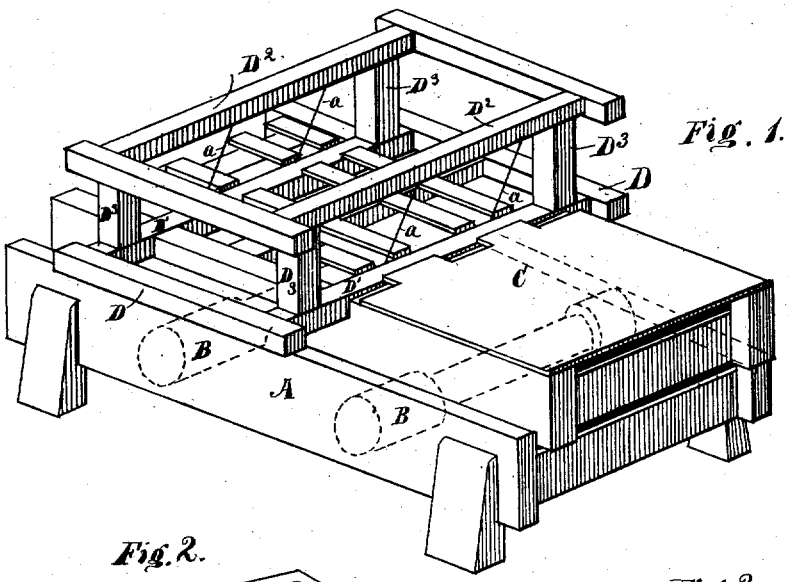
Figure 2:
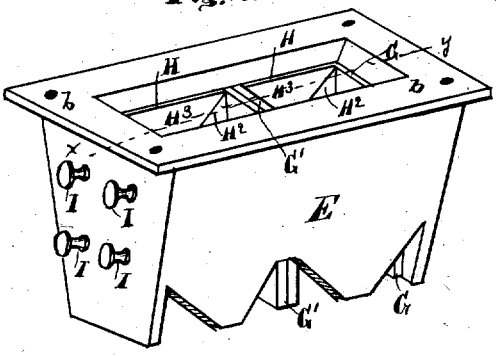
Figure 3:
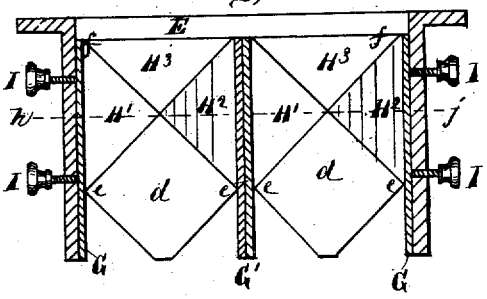
Figure 4:
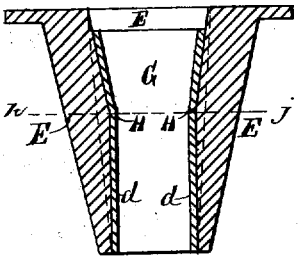
Figure 6:
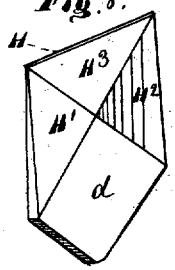
Figure 5:
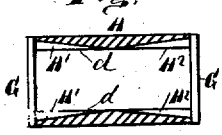

In the accompanying drawings, in which like letters of reference in the different figures indicate like parts, Figure 1 represents a perspective view of the stationary table, the movable table, and the sliding gate or cut-off. Fig. 2 is a perspective view of the oblong funnel or contracted compression-chamber through which the column of material is forced out horizontally. Fig. 3 is a horizontal sectional view of the contracted compression-chamber or funnel, taken at the line *x y* of Fig. 2, showing the arrangement of parts inside of the chamber. Fig. 4 is a vertical section of the same, taken at the line *f g* of Fig. 2, showing a transverse view of parts shown in Fig. 3. Fig. 5 is a longitudinal vertical section of the funnel or contracted compress-chamber, taken at the line *h j* of Figs. 3 and 4, showing an end view of the opening and a partial view of the adjustable tapered sides of the compress-chamber. Fig. 6 is a perspective view of one of the adjustable side plates of the contracted compress-chamber or funnel.

A represents a stationary table of any required dimensions, which is provided with rollers B B, which operate in suitable bearings, and adapted to support and allow a movable table, C, to operate thereon.

In the top of the movable table C, at right angles to its line of motion horizontally, are cut or attached suitable cross guides or grooves, in which the lower sliding sills $D^1$ of the cut-off operate laterally.

The cut-off D is constructed of frame-work similar to that shown in Fig. 1. The lower sliding sills $D^1$ $D^1$ are let into the top of the movable table C, so as to have their upper surfaces flush with the top of said table, and permit the columns of compressed material which are gradually forced from the press-box to pass over the said sills uninterrupted.

The top frame-bars $D^2$ $D^2$ are supported by upright posts $D^3$, and the wires *a a*, which are used for cutting off a brick of the proper length from a column of compressed material, are stretched across the spaces between the two bottom and top bars $D^1$ and $D^2$, in the manner shown in Fig. 1.

The table C, together with the cut-off D, travels along the stationary table with a column of compressed clay, which is continually forced out of a grinder or press, until the wires *a a* of the cut-off have severed a piece from said column of the proper length of a brick. Then the table C and cut-off are moved back until stopped by contact with stops or the end of the funnel from which the column of material is being ejected, and is held there until enough material has been advanced to make another brick, when said table and cut-off are again allowed to move forward until the brick has been cut off. This operation is repeated as often as the column of clay advances the required length to make a brick.

E is a cast-iron chamber, with a flange, *b*, at one end, by means of which the chamber is attached to a grinder or press-box. The inside of the chamber E is oblong and tapering—that is, it is larger at the end which is secured to the grinder-box than at its exit. It has inclined sides at the top and bottom, which reduce the opening vertically. Inside of the tapering chamber E are fitted adjustable plates or gibs H H at the top and bottom, with a vertical partition, G′, in the center of the chamber and end plates G G. These end plates act as clamps on the inclined side plates H H, and hold said side plates at any required angle by means of the binding-screws I I at the ends. The inner faces of the plates H H are of peculiar construction, as follows: The outer end part *d* is perfectly flat, as shown in Figs. 3, 4, and 6. The sides $H^1$ $H^2$ and the end $H^3$ are all beveled from the upper edge of the flat part *d* sidewise and endwise, so as to make inclined or tapering sides and top, as shown. By means of these adjustable plates or sides of the funnel the chamber has an additional gradual contraction besides that given to the interior of the chamber E, and the plates can be removed and new ones inserted in the chamber as they become warm.

It will be seen from the foregoing that when the machine is in operation and a grinder in motion the material that is to be compressed into columns is forced horizontally from a grinder box or tub into the tapered compress-chamber or funnel E, where it receives a vertical and a slightly lateral compression; but, to still more retard the column and further compress the material to the required size and degree of compactness, the inclined parts $H^1$ $H^2$ $H^3$ of the adjustable plates or gibs H further compress the material vertically, and by their peculiar formation the material is crowded into the corners *f e* before it reaches the flat part *d* of the exit, which completes the form of the brick or column, as it is ejected from the adjustable tapered compress-chamber E in solid perfect columns, which are continually advanced on the table C, where it is cut into bricks of the required length, as before described.

By means of this contracted chamber or funnel, necessitating greater force on the part of the grinder in pushing the material through, the requisite pressure is obtained by the grinder upon the clay necessary to grind the clay to the required fineness. Without such pressure the clay could not be ground to the required fineness, nor could the bricks be pressed into the necessary compactness; and this pressure is afforded by so retarding the material by means of the adjustable contracted exit that a head or resistance to the material is produced.

The column of compressed clay is being constantly re-enforced from the hopper, and under pressure is constantly being pushed into the funnel, so that the additional material from behind, supplied from the hopper, is, by the peculiar mechanism of the grinder, constantly forced against and expels the compressed material in front at the contracted exit.

What I claim is—

1. The adjustable tapering funnel or chamber E, having adjustable straight sides H H, secured at any required taper by means of the set-screws I I, by means of which the size of the mouth-funnel is regulated, in the manner described.

2. An adjustable contracted funnel, E, with straight tapering sides, in combination with any suitable power mechanism operated in a grinder or press-box, by which material from behind the contracted funnel is forced into it and the adjustable exit, and so resists the egress of the material that the material between the exit and said power is compressed, in the manner and for the purpose described.

3. A contracted funnel, E, with two adjustable sides, H H, in the manner and for the purpose substantially as shown and described.

4. The adjustable sides H H of a contracted funnel, with tapering sides $H^1$ $H^2$ and tapering end $H^3$ and flat part *d*, in combination with the binding-plates G G′, screws I I, and funnel E, in the manner and for the purpose substantially as shown and described.

5. In combination with the adjustable straight tapering sides H H of a compress-chamber or funnel, E, the central partition G′ and end clamp-plates G G and binding-screws I I, in the manner and for the purpose substantially as shown and described.

In testimony whereof I have hereunto set my hand this 5th day of March, 1878.

ZELORA PHILLIPS.

Witnesses:
JNO. R. LASH,
D. E. JONES.